United States Patent Office 3,270,271
Patented August 30, 1966

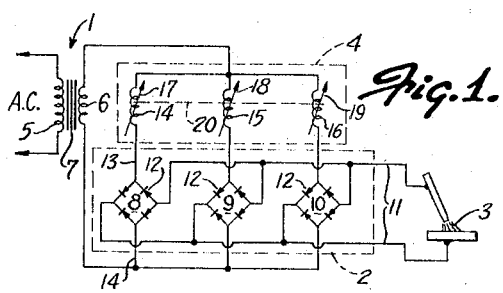
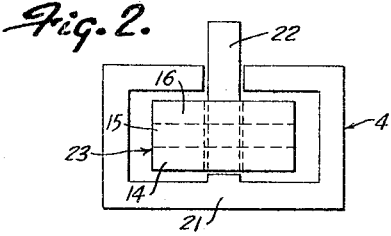
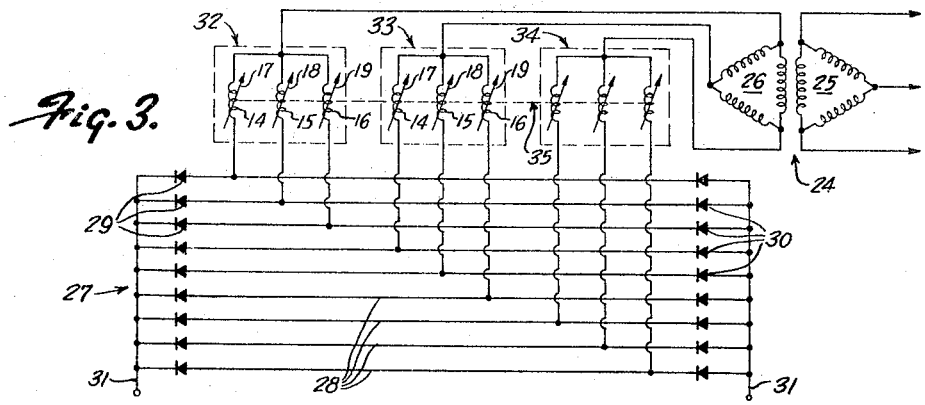
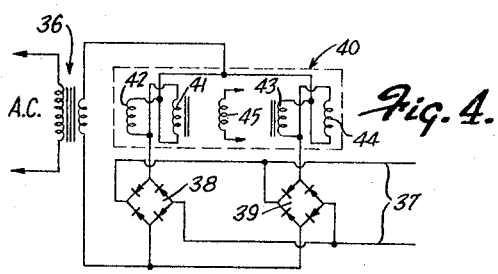
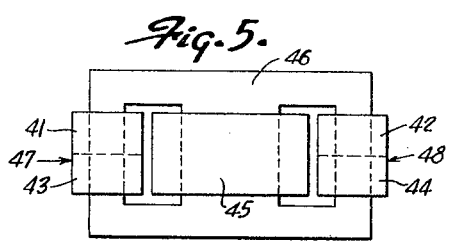
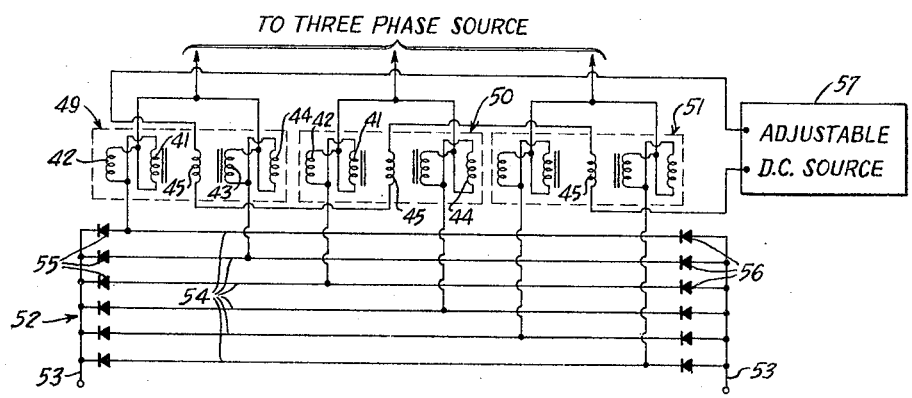

3,270,271
DIRECT CURRENT POWER SOURCES WITH MEANS FOR CONTROLLING THE CURRENT BALANCE THROUGH RECTIFIERS
Robert L. Stuefen, Fontana, Wis., assignor, by mesne assignments, to Harnischfeger Corporation, Milwaukee, Wis., a corporation of Wisconsin
Filed Mar. 21, 1963, Ser. No. 266,966
7 Claims. (Cl. 321—25)

This invention relates to direct current power sources employing parallel connected diodes of the low-loss type and particularly to such a circuit employing an integral current control and balancing unit to prevent destruction of the diodes while maintaining or establishing preselected current in the output circuit.

In an arc power process and many other processes, a direct current is often most satisfactorily employed in certain types of work. A highly satisfactory direct current source employs a transformer to reduce the normal line voltage to a suitable voltage for arc welding in combination with a full wave rectifying circuit connected across the output of the transformer to transform the alternating current into a suitable direct current for establishing and maintaining an arc. Within the last decade, silicon and germanium type diode rectifiers, which conduct in essentially only one direction, have been developed to a relatively reliable status. These diodes are small, compact units having a very low forward resistance with a resulting minimum power loss during the operation and a relatively small back leakage current.

However, individual diodes for arc power supplies or circuits and the like of the best practical quality have varying forward voltage characteristics. As a result, when such diodes are connected in parallel, to increase the capacity of the source, the problem of current distribution between the diodes is severe. Thus, the diode with the lower forward voltage characteristic tends to carry an abnormal share of the total current and, as a result, under unit overloads, will fail rather rapidly. The current then distributes to the other diodes and causes rapid failure thereof. The problem is made more difficult by the fact that characteristics of diodes may change with age, temperature conditions and other uncontrollable parameters. As a result, even if the diodes are evenly matched initially as to characteristic, they become mismatched in operation, and this results in a relatively rapid breakdown of the complete circuit.

Various means have been proposed for balancing of the current through the rectifier elements. For example, U.S. Patent 2,994,028 discloses a particular inductive means for inserting inductance in circuit with each of the diodes. The inductance is of such character as to force a current balance between parallel diodes of different characteristics. United States Patent 2,965,803 discloses a polyphase system wherein separate secondary windings of transformers are provided for each pair of operating rectifier units with the reactance of the secondaries functioning to provide the inductive characteristic for maintaining current balance between the paralleled diodes. Although the prior art structures have attained satisfactory current balance, they have certain disadvantages from the standpoint of cost and production. For example, the provision of a great plurality of secondaries, such as suggested in Rebuffoni, requires custom construction of the power sources and a great plurality of secondary windings with the attendant expense.

The present invention is particularly directed to an improved D.C. power source particularly adapted for furnishing D.C. current from a transformer through a rectifier employing a plurality of parallel connected diodes. Although described hereinafter with respect to a single diode, the present invention may employ more than one diode in series. For purposes of description and definition, a diode rectifier will be used generally for both a single diode and a plurality of series connected diodes.

In accordance with the present invention, the amplitude of current output is controlled through a variable saturable reactor of a special construction. More particularly, a variable reactor current control is provided having a separate winding for each rectifying leg in each phase of the power source. The windings for each phase are wound on a common core having means associated with that core for adjusting the current; for example, by moving of the core or coil with respect to each other or by a saturable reactor control. In addition to controlling the magnitude of the current, the reactor windings force a current balance through the diodes and prevent destructive unbalance currents.

Further, in accordance with the present invention, the variable reactor is preferably constructed to be coupled either in a single phase or a polyphase such as a three phase circuit. This allows production of a standard reactor unit which can be incorporated either in a single phase or a polyphase power source and, therefore, minimizes the production and inventory cost.

The present invention thus provides a relatively simple inexpensive integral reactor structure for establishing current balance without the necessity of auxiliary components.

The drawing furnished herewith illustrates the best mode presently contemplated for carrying out the invention.

In the drawing:

FIG. 1 is a schematic circuit of a direct current source employing a single phase transformer and a full wave rectifying unit adapted to produce a direct current suitable for arc welding;

FIG. 2 is a diagrammatic illustration of a moving core reactor for incorporation in the structure of FIG. 1 and constructed in accordance with the present invention;

FIG. 3 is a schematic circuit diagram of a direct current power source including a three phase input and employing reactor units similar to that shown in FIGS. 1 and 2;

FIG. 4 is a view similar to FIG. 1 showing a reactor, a D.C. power source having a single phase input and a saturable reactor control current level and current balancing control in accordance with the present invention;

FIG. 5 is a diagrammatic illustration of a saturable reactor such as shown in FIG. 4; and FIG. 6 is a view of a direct current source having a three phase input and employing a saturable reactor such as shown in FIGS. 4 and 5.

Referring to the drawings and particularly to FIG. 1, a single phase transformer 1 is shown connected to a suitable A.C. source such as a conventional power distribution employed in this country. A rectifying unit 2 is connected to the output of the transformer 1 and connected to supply a suitable direct current to a direct current load shown as a welding arc 3. A current control reactor 4 of a variable reactance characteristic is interposed between the transformer 1 and the rectifying unit 2. The reactor 4 can be adjusted, as hereinafter described, to adjust the level of the output current supplied to the arc 3. The reactor 4 further serves under all settings to maintain equal current distribution between the individual elements of the rectifying unit 2, as hereinafter described.

The illustrated single phase transformer 1 is diagrammatically shown including a primary 5 connected to the A.C. source and a secondary 6 magnetically coupled to the primary 5, shown diagrammatically by line 7. The output of the secondary is transformed to a direct current via rectifying unit 2. In the illustrated embodiment of the invention, the rectifying unit includes three full wave bridge rectifiers 8, 9 and 10 respectively connected in parallel with each other across a pair of D.C. output lines 11 which are connected to supply the current to the arc 3.

The rectifiers 8 through 10 each includes a single individual diode 12 in each leg thereof. Individual input lines 13 and 14 are provided for connecting each of the rectifiers 8 through 10 to the secondary 6 of the transformer 1. Lines 14 are connected in common directly to one side of the secondary 6. The lines 13 are connected through the reactor 4 to the opposite side of secondary 6, as follows.

The reactor 4, in accordance with the present invention, includes three individual control windings 14, 15 and 16 which are connected in common at one end to the secondary 6. The opposite ends of the several windings 14 through 16 are connected respectively to the individual input line 13 of the bridge rectifiers 8, 9 and 10.

The reactance of each control winding 14 through 16 is adjustable, as shown diagrammatically by the several control arrows 17, 18 and 19 passing through the corresponding windings. Adjustment of the windings 14–16 is made similar as by ganging of the controls, shown diagrammatically by the gang line 20.

In operation, the alternating current from the transformer secondary 6 follows in opposite directions and is divided between the three rectifying circuit branches consisting respectively of winding 14 and rectifier 8, winding 15 and rectifier 9, and winding 16 and rectifier 10. The current in each branch flows similarly through the corresponding winding and rectifier. Referring to the branch including rectifier 8, during one-half the cycle, current flows through winding 14 and line 13 to rectifier 8, through the upper left diode 12 and the lower line 11 in the drawing, through arc 3 and upper line 11 to the opposite output terminal of rectifier 8 and then through the lower right diode 12 and line 14 to the side of the secondary 6. During the opposite half-cycle, the current flows in the opposite direction through rectifier 8 being carried by the opposite pair of diodes 12.

The magnitude of the current in each branch is determined by the reactance of the corresponding reactor winding 14, 15 or 16. The controls 17–19 therefore are interconnected and thus establish the same current in each branch circuit. In addition, the reactance of the windings 14–16 essentially constitutes the complete impedance of the corresponding branches and the effect of the characteristic of the diodes 12 on the magnitude of current therethrough is for all practical consideration eliminated.

A preferred construction of the reactor 4 is shown in FIG. 2 and includes a rectangular core 21 having one side portion thereof centrally broken to define an air gap. A movable central leg 22 is supported in any suitable manner, not shown, for relative longitudinal movement through the air gap in the plane of the core 21. A reactor coil 23 is wound about the central leg 22 and held stationary. The coil 23 includes the three control windings 14, 15 and 16, separately and individually wound on the central leg 22. In operation, the operator manually or otherwise positions the central leg 22 to simultaneously and similary vary the reactance of the windings 14, 15 and 16 to provide the desired output current.

During the actual operation of the circuit at the preset position of the leg 22, the current is supplied by transformer 1 at a suitable voltage for operating of the arc 3. The rectifying unit transforms the alternating current into a direct current suitable for the arc 3. The reactance of the several windings 14, 15 and 16, although providing current control, is sufficiently greater than that of conductive characteristic of the associated diodes 12 as to essentially completely control the current distribution. If a greater current tends to flow through one of the windings 14, 15 or 16, a transformer action is established with the other windings which tends to rebalance the current through the three coils.

Thus, the present invention provides a relatively simple integrated adjustable reactor for determining the magnitude of load current and maintaining current balance through the paralleled diodes.

The reactor 4 of FIGS. 1 and 2 is adapted to be directly incorporated in a three phase system, such as schematically shown in FIG. 3.

Referring particularly to FIG. 3, a three phase transformer 24 is shown having a delta connected primary 25 connected to a suitable incoming power source and a delta connected secondary 26. A bank of rectifiers 27 is connected in a full wave rectifying circuit including nine rectifying branches or legs 28, three for each phase of the three phase system. Each branch or leg 28 includes a pair of single diodes 29 and 30 connected between the D.C. output lines 31 and similarly polarized to allow current to the one line and from the opposite line. Three adjustable reactors 32, 33 and 34 constructed in accordance with the previously described reactor 4 are provided, and connect each phase of the transformer secondary 26 to the three corresponding branch lines 28, generally in accordance with the single phase connection shown in FIG. 1. The corresponding elements of reactors 4, 32, 33 and 34 are similarly numbered for clarity and continuity of description. Each of the windings 14, 15 and 16 in each reactor 32–34, inclusive, has the common end interconnected to a transformer secondary terminal and the opposite end connected intermediate the pair of diodes 29 in a different branch line or leg 28.

In the illustrated embodiment of the invention, the control of the several reactors 32, 33 and 34 is interconnected, as shown by the ganged control line 35 to provide simultaneous and similar adjustment of the reactance of the windings. Generally, the embodiment of the invention shown in FIG. 3 functions in the same manner as that shown in FIG. 1 with the setting of the core of the reactors 32–34 determining the magnitude of the direct current supply to a load. The individual windings of the reactors 32–34 serve to maintain current balance through the diodes 29 associated with that phase of the current.

Although the adjustable reactors have been shown and described as moving core units, suitable moving coil reactors may be provided. Further, the present invention can also employ a saturable reactor control such as schematically shown in FIG. 4.

Referring to FIG. 4, a single phase transformer 36 is adapted to supply power to D.C. output lines 37 through a pair of full wave rectifiers 38 and 39. The illustrated rectifiers are of the bridge construction similar to those shown in the embodiment of FIG. 1.

A saturable reactor control unit 40 includes a first pair of similar windings 41 and 42 which are oppositely wound on a common magnetic core, not shown in FIG. 4. The windings 41 and 42 are connected in parallel with each other between the one side of the transformer 36 and the input to the rectifier 38. A second pair of similar windings 43 and 44 constructed generally as windings 41 and 42 and wound on the same magnetic core are connected between transformer 36 and the second rectifier 39. The parallel connected windings 43 and 44 are therefore also connected in parallel with the first pair of windings 41 and 42. A single D.C. control coil 45 is coupled to the common magnetic core for the windings 41–44 inclusive and serves to provide substantially similar saturation of the core and, therefore, the reactance of the windings 41–44.

The reactor control unit 40 of FIG. 4 is preferably constructed in accordance with the diagrammatic illustration of FIG. 5.

Referring particularly to FIG. 5, a core 46 is shown having three spaced leg portions with control coils 47 and 48 wound on the outermost leg portions. Coil 47 includes windings 41 and 43 separately and individually wound on the opposite core portions of the outer loop or magnetic path and interconnected as shown in FIG. 4. Similarly, coil 48 includes the windings 42 and 44 wound on the corresponding opposite core portions. The D.C. control winding 45 is wound on the central leg portion and connected to any adjustable direct current source, not shown, for adjusting the saturation of the core 46 and thereby adjusting the reactance of the windings 41–44. The opposite winding direction of winding in each of the coils 47 and 48 maintains a constant net impedance in the respective branches even though the magnetic flux of each load winding is alternately in the same and opposite direction with respect to the flux of winding 45.

In operation, the current divides through the control coils 47 and 48 and therein through the coils 41 and 42 and windings 43 and 44 respectively. The current then passes through the series connection of a pair of diodes of the rectifiers 38 and 39 with the load, not shown. At all times, the single phase current in passing through the diodes is connected in series with the reactor winding 41–44, inclusive. Under all conditions of saturation, the reactance of the windings 41–44 is sufficient to prevent damaging unbalance of currents between the rectifiers 38 and 39 and consequently prevents damaging of the diodes and eliminates the requirement for matching of the diodes.

In FIG. 6, a plurality of saturable reactor units 49, 50 and 51 corresponding to the unit of FIGS. 4 and 5 are shown connected in a three phase direct current source. The corresponding elements are similarly numbered for simplicity and clarity of explanation. The reactor units 49, 50 and 51 interconnect a three phase source, not shown, to a rectifier bank 52 for providing a D.C. output at a pair of output leads 53.

The rectifier bank 52 includes six similar rectifying legs 54 each including a pair of single diodes 55 and 56. The six rectifying legs 54 are divided into three groups of two, one each phase of the three phase source. The saturable reactors 49, 50 and 51 are connected to the corresponding rectifying legs 54 at the connection of the diodes 55 and 56 to insert the paralleled windings 41 and 42 in series with one leg and the paralleled windings 43 and 44 in series with the other leg. The D.C. windings 45 of the three reactors 49, 50 and 51 are connected in series to a suitable adjustable D.C. source 57 to provide identical saturation of the three reactors and consequently insertion of essentially identical reactance into each branch of the circuit. Further, the minimum reactance of the reactor windings 41–44 is sufficiently great to control the current in the corresponding branches independently of the characteristics of the diodes 55 and 56 and therefore insures current balance.

In summary, the saturation of reactors 49, 50 and 51 determines the output current and at all load currents prevents damaging unbalance currents in the rectifier bank 52.

Although the present invention has been specially shown in full wave bridge type rectifying circuits, any other desired type might be employed within the scope of the invention as defined in the claims herein.

The present invention thus provides an adjustable or variable reactor having a plurality of separate control windings, the reactance of which is adjusted to produce a preselected load current and in combination with the rectifier serves to maintain current balance. The integrated dual purpose reactor in accordance with the present invention may be applied to a single phase or three phase power circuit.

Various modes of carrying out the invention are contemplated as being within the scope of the following claims particularly pointing out and distinctly claiming the subject matter which is regarded as the invention.

I claim:
1. In a direct current source,
  (a) an alternating current input,
  (b) a plurality of parallel connected diode rectifiers defining simultaneously parallel conducting circuits, and
  (c) a variable reactor means connecting said diode rectifiers to said alternating current input, said reactor including separate current control windings, means to adjust the reactance of the several separate windings to the same reactance, said windings being connected with a common alternating current input terminal, one each being connected in series with each of the diode rectifiers such that the current through a diode rectifier is essentially determined by the corresponding control winding.

2. In a direct current source,
  (a) an alternating current input,
  (b) a plurality of parallel connected diode rectifiers defining simultaneously parallel conducting circuits, and
  (c) a variable reactor means connecting said diode rectifiers to said alternating current input, said reactor including a single magnetic core having a plurality of separate current control windings wound about a common portion of the core and having a common alternating input terminal, and means to adjust the reactance of the several separate windings to the same reactance, and said control windings being connected with a common alternating current input terminal, one each being connected in series with one diode rectifier such that the current through a diode rectifier is essentially determined by the reactance of the corresponding winding.

3. A direct current source for transforming a single phase current into a direct current,
  (a) a rectifying means having a plurality of simultaneously conducting parallel branches each containing at least one diode,
  (b) a reactor core having a movable portion for varying the reluctance of the core, and
  (c) a plurality of current control windings having a common input terminal, one for each of said simultaneously conducting branches encircling said movable portion to establish the magnitude of the direct current output, said separate windings further constituting means to establish essentially identical current through the diodes.

4. A direct current source for converting a polyphase alternating current to a direct current, which comprises an individual rectifying circuit for each phase of said alternating current, each of said individual rectifying circuits including,
  (a) a plurality of paralleled simultaneously conducting rectifying branch circuits each of which includes low loss type diode rectifiers,
  (b) a reactor having a single core and a plurality of current setting reactance windings each one being connected in series with one of said rectifying branches to establish the magnitude of the output current and the branch current independently of the conductive characteristic of the diode rectifier, and
  (c) means to similarly adjust the reactance of all said windings.

5. The direct current source of claim 4, wherein each of said rectifying circuits includes,
  (a) three paralleled rectifying branch circuits, and
  (b) three related reactance windings interconnected at one end and connected to the corresponding branch circuits at the opposite end.

6. A direct current source for converting an alternating current to a direct current, which comprises an individual rectifying circuit for each phase of said alternating current, each of said individual rectifying circuits including,
  (a) a pair of paralleled rectifying branch circuits, each of which includes low loss type diode rectifiers,
  (b) a reactor having a single core and a pair of current setting coils, said coils being connected one each in series with one of said rectifying branches and including a pair of oppositely wound windings, and (c) saturating means coupled to the core to similarly adjust the reactance of all said coils and thereby establish the magnitude of the output current and the branch currents independently of the conductive characteristic of the diode rectifier.

7. A direct current source for converting an alternating current to a direct current, which comprises an individual rectifying circuit for each phase of said alternating current, each of said individual rectifying circuits including, (a) a pair of paralleled rectifying branch circuits each of which includes low loss type diode rectifiers, (b) a magnetic core having a continuous magnetic loop portion and a central bridging portion, (c) a first pair of oppositely wound series connected coils connected in one of said rectifying branches and disposed on said loop portion one each on opposite sides of the bridging portion, (d) a second pair of oppositely wound series connected coils connected in the other of said rectifying branches and disposed on said loop portion one each on opposite sides of the bridging portion, and (e) saturating means wound on said bridging portion to similarly adjust the reactance of all said coils and thereby establish the magnitude of the output current and the branch currents independently of the conductive characteristic of the diode rectifier.

References Cited by the Examiner

UNITED STATES PATENTS

| 2,304,668 | 12/1942 | Tyrner | 336—117 |
| 2,752,529 | 6/1956 | Croco et al. | 321—25 |
| 2,994,028 | 7/1961 | Dortort | 336—175 |

JOHN F. COUCH, *Primary Examiner.*

LLOYD McCOLLUM, *Examiner.*

G. GOLDBERG, *Assistant Examiner.*